United States Patent
Liang et al.

(10) Patent No.: US 10,250,700 B2
(45) Date of Patent: Apr. 2, 2019

(54) METHODS AND DEVICES FOR NOTIFYING AUTHORIZATION UPDATE

(71) Applicant: ZTE Corporation, Shenzhen (CN)

(72) Inventors: Shuang Liang, Shenzhen (CN); Jinguo Zhu, Shenzhen (CN); Fei Lu, Shenzhen (CN); Zaifeng Zong, Shenzhen (CN); Shilin You, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 0 days.

(21) Appl. No.: 15/533,088

(22) PCT Filed: May 26, 2015

(86) PCT No.: PCT/CN2015/079860
§ 371 (c)(1),
(2) Date: Jun. 5, 2017

(87) PCT Pub. No.: WO2016/086625
PCT Pub. Date: Jun. 9, 2016

(65) Prior Publication Data
US 2017/0359427 A1   Dec. 14, 2017

(30) Foreign Application Priority Data

Dec. 3, 2014   (CN) .......................... 2014 1 0727427

(51) Int. Cl.
| | |
|---|---|
| H04W 4/21 | (2018.01) |
| H04L 29/08 | (2006.01) |
| H04W 4/02 | (2018.01) |
| H04W 8/00 | (2009.01) |
| H04W 76/14 | (2018.01) |
| H04W 12/02 | (2009.01) |
| H04W 12/08 | (2009.01) |

(52) U.S. Cl.
CPC ............ H04L 67/16 (2013.01); H04L 67/306 (2013.01); H04W 4/023 (2013.01); H04W 4/21 (2018.02);
(Continued)

(58) Field of Classification Search
CPC ..... H04W 76/14; H04W 8/005; H04W 92/18; H04W 88/02; H04W 4/02; H04W 4/023;
(Continued)

(56) References Cited

U.S. PATENT DOCUMENTS

| | | | |
|---|---|---|---|
| 2008/0019300 A1* | 1/2008 | Perzy .................. | H04L 12/1822 370/328 |
| 2014/0342735 A1* | 11/2014 | Liao ....................... | H04W 8/04 455/435.1 |

FOREIGN PATENT DOCUMENTS

| | | |
|---|---|---|
| CN | 103731830 A | 4/2014 |
| CN | 103856927 A | 6/2014 |
| CN | 104066070 A | 9/2014 |

OTHER PUBLICATIONS

International Search Report for corresponding application PCT/CN2015/079860 filed on May 26, 2015; dated Aug. 17, 2015.
(Continued)

*Primary Examiner* — Kwasi Karikari
(74) *Attorney, Agent, or Firm* — Cantor Colburn LLP

(57) ABSTRACT

Methods and devices for notifying an authorization update are provided. In a method for notifying an authorization update, a home network Proximity-based Services (ProSe) functional entity of an announcing terminal receives a notification message from a ProSe application server, where the notification message is used for notifying the home network ProSe functional entity of the announcing terminal that authorization information changes (S302); and the home network ProSe functional entity of the announcing terminal notifies a home network ProSe functional entity of a monitoring terminal that a ProSe code and/or filter corresponding to the announcing terminal become/becomes invalid or are/is updated (S304).

16 Claims, 9 Drawing Sheets

(52) U.S. Cl.
CPC ........... *H04W 8/005* (2013.01); *H04W 76/14* (2018.02); *H04W 12/02* (2013.01); *H04W 12/08* (2013.01)

(58) Field of Classification Search
CPC ....... H04W 4/80; H04W 4/70; H04W 56/001; H04W 76/10; H04W 76/11; H04W 12/02; H04W 12/06; H04W 72/1215; H04W 76/30
See application file for complete search history.

(56) References Cited

OTHER PUBLICATIONS

European Search Report for corresponding application EP 15 86 5082; Report dated Jan. 4, 2018.

Huawei, et al., "Restricted Direct Discovery Update Procedure in Model A", vol. SA WG2, No. San Francisco, 29141117-29141121, Nov. 22, 2014, XP050923945; Retrieved from the Internet: URL: Http://www.3gpp.org/ftp/tsg_sa/WG2_Arch/TSG52_106_San_Fransisco/Docs.

Qualcomm Inc, "Permission Control for ProSe Restriction Discovery", 3GPP Draft, Prose Restriction Permission Handling, vol. SA WG2, No. Dublin, Jul. 2, 2014, XP050836875, Retrieved from the Internet: URL: http://www.3gpp.org/ftp/tsg_WG2_Arch/TSGS2_104_Dublin/Docs/.

Samsung: "Prose Restricted Discovery: Quick Unfriend", Nov. 17, 2014, vol. SA WG2, No. San Francisco, Retrieved fron the Internet: URL: http://www.3gpp.org/ftp/Meetings_SYNC/SA2/Docs.

ZTE Corporation, et al, "Improvement on Section 6.1.3 in ProSe Security TS" 3GPP Draft; May 11, 2014, vol. SA WG3, No. Japan: 20140512-20140516, XP050902710; Retrieved from the Internet; URL: http://www.3gpp.org/ftp/Meetings_3GPP_SYNC/SA/SA3/Docs.

* cited by examiner

METHODS AND DEVICES FOR NOTIFYING AUTHORIZATION UPDATE

TECHNICAL FIELD

The disclosure relates to the communication field, in particular to methods and devices for notifying an authorization update.

BACKGROUND

In order to keep competitiveness of a third generation mobile communication system in the communication field, provide users with more individualized mobile communication services with higher rate and lower time delay, and reduce operation cost of operators, the 3rd Generation Partnership Project (3GPP) standard group is committed to research on an Evolved Packet System (EPS).

When two terminals communicate through an EPS network, the two terminals may need to establish bearing with the EPS respectively. However, allowing for rapid development of intelligent terminals and various mobile Internet services, discovery of friends nearby and communication with the nearby friends may need to be supported for many services, so Proximity-based Services (ProSe) are spawned. A terminal supporting the ProSe function can communicate through a specific resource authorized by the network. A communication path for conducting this type of communication may not involve a core network. Such a communication mode reduces circuitry of a data route on one hand, and reduces a network data load on the other hand.

FIG. 1 is a structure diagram of main network elements after a ProSe function is introduced according to the related ProSe technology. As shown in FIG. 1, after the ProSe function is introduced, some network elements and interfaces are added in the network to support the ProSe function.

After obtaining authorization from the network, a terminal A and a terminal B supporting the ProSe function may discover and communicate with each other.

A functional entity named ProSe Function is introduced for supporting the ProSe. The ProSe Function mainly completes authorization and matching for a piece of User Equipment (UE) to discover or be discovered. In a part of solutions, this network element also is in charge of mutual discovery between two pieces of protocol UEs.

An Evolved Universal Terrestrial Radio Access Network (EUTRAN) provides a ProSe terminal with underlying access and necessary discovery and communication resources.

An Evolved Packet Core Network (EPC) may include: a Mobility Management Entity (MME) and a Serving Gateway (SGW)/Packet Data Network Gateway (PGW). These network elements provide the underlying access for the terminal to access the ProSe Function.

A Home Subscriber Server (HSS) including all functions of a Home Location Register (HLR) is a permanent storage location for subscription data of the user and is located in a home network subscribed by the user. After the ProSe is introduced, the network element needs to store ProSe-related subscription data.

A Secure User Plane Location Platform (SLP) is arranged to help discover an adjacent terminal.

A ProSe application server is arranged to map a user application layer Identifier (ID) and a user ID of a user in the 3GPP network.

The terminal supporting the ProSe may discover other terminals around. An open discovery mode or a restrained discovery mode may be set. In the open discovery mode, a terminal has no need to set authorization for other terminals, and can be discovered by the other terminals that can hear announcement of the terminal. However, in the restrained discovery mode, the terminal may set a specific friend list, and only a specific friend in the specific friend list can monitor or identify the terminal, so that the privacy of discovery and communication between the terminals can be ensured. In order to realize the restrained discovery mode, the ProSe application server is in charge of maintaining the friend list of the ProSe.

FIG. 2 is a schematic diagram of a friend discovery process of a terminal in the restrained discovery mode according to the related ProSe discovery technology. As shown in FIG. 2, the terminal may complete the friend discovery process through the authorization of the ProSe application server. The process may include the following acts S202 to S230.

At act S202, an announcing terminal (namely a terminal hoping to be discovered) obtains from an application server a restrained ProSe application identifier (the identifier may be allocated by the ProSe application server) of the announcing terminal.

At act S204, the announcing terminal sends a discovery request to a home ProSe functional entity of the announcing terminal. The discovery request may carry parameters such as the restrained ProSe application identifier and UE ID of the announcing terminal.

At act S206, if the ProSe functional entity does not have context of the UE, it may be needed to initiate an authorization process to the HSS, so as to obtain the ProSe-related subscription data of the user. If the terminal is permitted to perform a discovery process, the subsequent acts are executed; or else, a failure response is returned.

At acts S208-S210, the ProSe functional entity initiates the authorization process to the ProSe application server. Through the process, the ProSe functional entity can obtain a ProSe discovery identifier of the terminal. After the authorization is successfully completed, the ProSe functional entity allocates a ProSe code used for terminal announcement for the terminal.

In a roaming scenario, the home ProSe functional entity may acquire, through the above acts, Public Land Mobile Network (PLMN) information of a visited location where the terminal is currently registered, and then sends an announcement authorization request to the ProSe of the visited location after S208 to S210, where the announcement authorization request may carry parameters such as the ProSe code, a period of validity and a restrained ProSe application identifier.

At act S212, the ProSe functional entity returns an announcement response to the announcing terminal, where the announcement response may carry the ProSe code and the period of validity of the terminal.

At act S214, the terminal announces the received ProSe code.

At act S216, if a certain monitoring terminal hopes to monitor announcement information of its friend, the monitoring terminal sends to the ProSe application server an application layer ID of the terminal that the monitoring terminal expects to monitor. The ProSe application server returns to the monitoring terminal the restrained ProSe application identifier of the terminal that the monitoring terminal expects to monitor.

At act S218, the monitoring terminal sends a monitoring request to a home network ProSe functional entity, where the monitoring request may carry the restrained ProSe application identifier of the monitoring terminal and a container that may be transparently transferred to the ProSe application server, the container containing the restrained ProSe application identifier of the terminal that the monitoring terminal expects to monitor.

At act S220, if the ProSe functional entity does not have the context of the UE, it may be suggested to initiate the authorization process to the HSS, so as to obtain the ProSe-related subscription data of the user. If the terminal is permitted to perform the monitoring process, the subsequent acts are executed; or else, a failure response is returned.

At acts S222-S224, the ProSe functional entity initiates the authorization process to the ProSe application server. Through the process, the ProSe functional entity may obtain the restrained ProSe application identifier and the ProSe discovery identifier of the terminal that the monitoring terminal expects to monitor.

At acts S226-S228, a ProSe functional entity of the monitoring terminal initiates a monitoring request to a ProSe functional entity of the announcing terminal to obtain the ProSe code of the announcing terminal. Optionally, the ProSe functional entity of the announcing terminal may perform the authorization process again at the ProSe application server, so as to verify the validity of monitoring. The ProSe functional entity of the announcing terminal returns the ProSe code of the announcing terminal or ProSe filter information to the ProSe functional entity of the monitoring terminal.

At act S230, the ProSe functional entity of the monitoring terminal returns the ProSe code of the announcing terminal, or information including, e.g., the ProSe filter information and the period of validity. The terminal may filter the monitored information at an air interface according to the received code or filter information, so as to find a friend of the terminal.

In the above process, the ProSe application server is in charge of maintaining a friend relationship of the terminals on the application layer. Only the terminals in the specific friend list can discover each other, but the friend list may change. However, the change of the friend list is not considered in the related ProSe discovery technology, and once the friend relationship changes, the terminal which is monitoring or announcing is likely to be influenced.

To sum up, privacy of terminals cannot be ensured when a friend relationship between the terminals changes.

SUMMARY

Some embodiments of the disclosure provide methods and devices for notifying an authorization update, so as to at least solve the problem in a related ProSe discovery technology that when a friend relationship between the terminals changes, privacy of the terminals cannot be ensured.

According to an embodiment of the disclosure, a method for notifying an authorization update is provided.

The method for notifying an authorization update according to the embodiment of the disclosure may include the following acts. A home network ProSe functional entity of an announcing terminal receives a notification message from a ProSe application server, where the notification message is used for notifying the home network ProSe functional entity of the announcing terminal that authorization information changes. The home network ProSe functional entity of the announcing terminal notifies a home network ProSe functional entity of a monitoring terminal that a Pro Se code and/or filter corresponding to the announcing terminal become/becomes invalid or are/is updated.

In an exemplary embodiment, the act that the home network ProSe functional entity of the announcing terminal receives the notification message from the ProSe application server may include the following acts. The home network ProSe functional entity of the announcing terminal receives the notification message from the ProSe application server, where the notification message may carry at least one of: a restrained ProSe application identifier, a ProSe discovery identifier, or a permission change indicator, where the permission change indicator is indicative of a change from permitting the announcing terminal to announce into forbidding the announcing terminal to announce.

In an exemplary embodiment, the act that the home network ProSe functional entity of the announcing terminal receives the notification message from the ProSe application server may include the following acts. The home network ProSe functional entity of the announcing terminal receives the notification message from the ProSe application server, where the notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

In an exemplary embodiment, after the home network ProSe functional entity of the announcing terminal receives the notification message from the ProSe application server, the method may further include at least one of the following acts. The home network ProSe functional entity of the announcing terminal finds the announcing terminal according to context information of the announcing terminal, and notifies the announcing terminal that the announcing terminal is forbidden to continue announcing the previous ProSe code and/or filter. The home network ProSe functional entity of the announcing terminal issues the updated ProSe code and/or filter to the announcing terminal, or, notifies that the previous ProSe code and/or filter become/becomes invalid to trigger the announcing terminal to obtain the ProSe code and/or filter again.

In an exemplary embodiment, after the home network ProSe functional entity of the announcing terminal receives the notification message from the ProSe application server, the method may further include the following acts. The home network ProSe functional entity of the announcing terminal notifies a visited network ProSe functional entity of the announcing terminal that the previous ProSe code and/or filter announced by the announcing terminal have/has become invalid, and/or, sends the updated ProSe code and/or filter to the visited network ProSe functional entity of the announcing terminal. The home network ProSe functional entity of the announcing terminal receives a response message from the visited network ProSe functional entity of the announcing terminal.

In an exemplary embodiment, before the home network ProSe functional entity of the announcing terminal notifies the home network ProSe functional entity of the monitoring terminal that the ProSe code and/or filter corresponding to the announcing terminal become/becomes invalid or are/is updated, the method may further include the following acts. The home network ProSe functional entity of the announcing terminal determines the home network ProSe functional entity of the monitoring terminal according to information of the monitoring terminal provided by the ProSe application server or according to recorded information of the monitoring terminal which has obtained the previous ProSe code and/or filter announced by the announcing terminal from the home network ProSe functional entity of the announcing terminal.

In an exemplary embodiment, after the home network ProSe functional entity of the announcing terminal notifies the home network ProSe functional entity of the monitoring terminal that the ProSe code and/or filter corresponding to the announcing terminal become/becomes invalid or are/is updated, the method may further include at least one of the following acts. The home network ProSe functional entity of the monitoring terminal finds the monitoring terminal according to context information of the monitoring terminal, and notifies the monitoring terminal that a monitored ProSe code and/or filter have/has become invalid. The home network ProSe functional entity of the monitoring terminal notifies the updated ProSe code and/or filter to the monitoring terminal, or triggers the monitoring terminal to obtain the Pro Se code and/or filter again.

According to another embodiment of the disclosure, another method for notifying an authorization update is provided.

The method for notifying an authorization update according to the embodiment of the disclosure may include the following acts. The ProSe application server notifies the home network ProSe functional entity of the announcing terminal that the authorization information changes. The ProSe application server notifies the home network ProSe functional entity of the monitoring terminal that the authorization information changes.

In an exemplary embodiment, the act that the ProSe application server notifies the home network ProSe functional entity of the announcing terminal that the authorization information changes may include the following acts. The ProSe application server sends the notification message to the home network ProSe functional entity of the announcing terminal, where the notification message may carry at least one of: the restrained ProSe application identifier, the ProSe discovery identifier, or a permission change indicator, where the permission change indicator is indicative of a change from permitting the announcing terminal to announce into forbidding the announcing terminal to announce.

In an exemplary embodiment, the act that the ProSe application server notifies the home network ProSe functional entity of the announcing terminal that the authorization information changes may include the following acts. The ProSe application server sends the notification message to the home network ProSe functional entity of the announcing terminal, where the notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

In an exemplary embodiment, after the ProSe application server notifies the home network ProSe functional entity of the announcing terminal that the authorization information changes, the method may further include at least one of the following acts. The home network ProSe functional entity of the announcing terminal finds the announcing terminal according to context information of the announcing terminal, and notifies the announcing terminal that the announcing terminal is forbidden to continue announcing the previous ProSe code and/or filter. The home network ProSe functional entity of the announcing terminal issues the updated ProSe code and/or filter to the announcing terminal, or, notifies that the previous ProSe code and/or filter become/becomes invalid to trigger the announcing terminal to obtain the ProSe code and/or filter again.

In an exemplary embodiment, after the ProSe application server notifies the home network ProSe functional entity of the announcing terminal that the authorization information changes, the method may further include the following acts. The home network ProSe functional entity of the announcing terminal notifies the visited network ProSe functional entity of the announcing terminal that the previous ProSe code and/or filter announced by the announcing terminal have/has become invalid, and/or, sends the updated ProSe code and/or filter to the visited network ProSe functional entity of the announcing terminal. The home network ProSe functional entity of the announcing terminal receives the response message from the visited network ProSe functional entity of the announcing terminal.

In an exemplary embodiment, the act that the ProSe application server notifies the home network ProSe functional entity of the monitoring terminal that the authorization information changes may include the following acts. The ProSe application server sends the notification message to the home network ProSe functional entity of the monitoring terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the announcing terminal to announce into forbidding the announcing terminal to announce.

In an exemplary embodiment, the act that the ProSe application server notifies the home network ProSe functional entity of the monitoring terminal that the authorization information changes may include the following acts. The ProSe application server sends the notification message to the home network ProSe functional entity of the monitoring terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

In an exemplary embodiment, after the ProSe application server notifies the home network ProSe functional entity of the monitoring terminal that the authorization information changes, the method may further include the following acts. The monitoring terminal finds the ProSe code and/or filter which are/is monitored by the monitoring terminal and have/has become invalid according to the notification message and the local context information.

In an exemplary embodiment, after the ProSe application server notifies the home network ProSe functional entity of the monitoring terminal that the authorization information changes, the method may further include the following acts. The home network ProSe functional entity of the monitoring terminal finds the monitoring terminal according to context information of the monitoring terminal, and notifies the monitoring terminal that a monitored ProSe code and/or filter have/has become invalid; and/or, the home network ProSe functional entity of the monitoring terminal triggers the monitoring terminal to obtain the ProSe code and/or filter again.

According to another embodiment of the disclosure, another method for notifying an authorization update is provided.

The method for notifying an authorization update according to the embodiment of the disclosure may include the following acts. The home network ProSe functional entity of the monitoring terminal receives the notification message from the ProSe application server, where the notification message is used for notifying the home network ProSe functional entity of the monitoring terminal that the authorization information changes; and the home network ProSe functional entity of the monitoring terminal triggers the monitoring terminal to initiate a monitoring process.

In an exemplary embodiment, the act that the home network ProSe functional entity of the monitoring terminal receives the notification message from the ProSe application server may include the following acts. The home network ProSe functional entity of the monitoring terminal receives the notification message from the ProSe application server. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

In an exemplary embodiment, before the home network ProSe functional entity of the monitoring terminal triggers the monitoring terminal to initiate the monitoring process, the method may further include the following acts. The home network ProSe functional entity of the monitoring terminal determines that the monitoring terminal once triggered a monitoring request but the monitoring request was refused; and the home network ProSe functional entity of the monitoring terminal notifies the monitoring terminal to obtain the ProSe code and/or filter of the announcing terminal again.

In an exemplary embodiment, the act that the home network ProSe functional entity of the monitoring terminal triggers the monitoring terminal to initiate the monitoring process may include the following acts. The home network ProSe functional entity of the monitoring terminal notifies the monitoring terminal to monitor, according to a restrained ProSe application identifier of the announcing terminal, announcement performed by the announcing terminal. The restrained ProSe application identifier of the announcing terminal is used for the monitoring terminal to obtain an application layer ID of the announcing terminal.

According to another embodiment of the disclosure, a device for notifying an authorization update is provided.

The device for notifying an authorization update according to the embodiment of the disclosure is located in the home network ProSe functional entity of the announcing terminal, and includes: a first receiving module, which is arranged to receive the notification message from the ProSe application server, where the notification message is used for notifying the home network ProSe functional entity of the announcing terminal that the authorization information changes; and a first notifying module, which is arranged to notify the home network ProSe functional entity of the monitoring terminal that the ProSe code and/or filter corresponding to the announcing terminal become/becomes invalid or are/is updated.

In an exemplary embodiment, the first receiving module is arranged to receive the notification message from the ProSe application server. The notification message may carry at least one of: the restrained ProSe application identifier, the ProSe discovery identifier, or a permission change indicator, where the permission change indicator is indicative of a change from permitting the announcing terminal to announce into forbidding the announcing terminal to announce.

In an exemplary embodiment, the first receiving module is arranged to receive the notification message from the ProSe application server. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

In an exemplary embodiment, the above device may further include: a first processing module, which is arranged to find the announcing terminal according to context information of the announcing terminal, and notify the announcing terminal that the announcing terminal is forbidden to continue announcing the previous ProSe code and/or filter; and/or, a second processing module, which is arranged to issue the updated ProSe code and/or filter to the announcing terminal, or, notify that the previous ProSe code and/or filter become/becomes invalid to trigger the announcing terminal to obtain the ProSe code and/or filter again.

In an exemplary embodiment, the above device may further include: a second notifying module, which is arranged to notify the visited network ProSe functional entity of the announcing terminal that the previous ProSe code and/or filter announced by the announcing terminal have/has become invalid, and/or, send the updated ProSe code and/or filter to the visited network ProSe functional entity of the announcing terminal; and a second receiving module, which is arranged to receive the response message from the visited network ProSe functional entity of the announcing terminal.

In an exemplary embodiment, the above device may further include: a determining module, which is arranged to determine the home network ProSe functional entity of the monitoring terminal according to the information of the monitoring terminal provided by the ProSe application server or according to the recorded information of the monitoring terminal which has obtained the previous ProSe code and/or filter announced by the announcing terminal from the home network ProSe functional entity of the announcing terminal.

According to another embodiment of the disclosure, another device for notifying an authorization update is provided.

The device for notifying an authorization update according to the embodiment of the disclosure is located in the ProSe application server, and includes: a first notifying module, which is arranged to notify the home network ProSe functional entity of the announcing terminal that the authorization information changes; and a second notifying module, which is arranged to notify the home network ProSe functional entity of the monitoring terminal that the authorization information changes.

In an exemplary embodiment, the first notifying module is arranged to send the notification message to the home network ProSe functional entity of the announcing terminal. The notification message may carry at least one of: the restrained ProSe application identifier, the ProSe discovery identifier, or a permission change indicator, where the permission change indicator is indicative of a change from permitting the announcing terminal to announce into forbidding the announcing terminal to announce.

In an exemplary embodiment, the first notifying module is arranged to send the notification message to the home network ProSe functional entity of the announcing terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

In an exemplary embodiment, the second notifying module is arranged to send the notification message to the home network ProSe functional entity of the monitoring terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the announcing terminal to announce into forbidding the announcing terminal to announce.

In an exemplary embodiment, the second notifying module is arranged to send the notification message to the home network ProSe functional entity of the monitoring terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

According to another embodiment of the disclosure, another device for notifying an authorization update is provided.

The device for notifying an authorization update according to the embodiment of the disclosure is located in the home network ProSe functional entity of the monitoring terminal and includes: a receiving module, which is arranged to receive the notification message from the ProSe application server, where the notification message is used for notifying the home network ProSe functional entity of the monitoring terminal that the authorization information changes; and a triggering module, which is arranged to trigger the monitoring terminal to initiate a monitoring process.

In an exemplary embodiment, the receiving module is arranged to receive the notification message from the ProSe application server. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

In an exemplary embodiment, the device may further include: a determining module, which is arranged to determine that the monitoring terminal once triggered a monitoring request but the monitoring request was refused; and a notifying module, which is arranged to notify the monitoring terminal to obtain the ProSe code and/or filter of the announcing terminal again.

In an exemplary embodiment, the triggering module is arranged to notify the monitoring terminal to monitor the announcement performed by the announcing terminal according to the restrained ProSe application identifier of the announcing terminal. The restrained ProSe application identifier of the announcing terminal is used for the monitoring terminal to obtain the application layer ID of the announcing terminal.

According to the embodiments of the disclosure, a home network ProSe functional entity of an announcing terminal receives a notification message from a ProSe application server, where the notification message is used for notifying the home network ProSe functional entity of the announcing terminal that authorization information changes; and the home network ProSe functional entity of the announcing terminal notifies a home network ProSe functional entity of a monitoring terminal that a ProSe code and/or filter corresponding to the announcing terminal become/becomes invalid or are/is updated. In such a manner, the problem in a related ProSe discovery technology that privacy of terminals cannot be ensured when a friend relationship between the terminals changes is solved, thus ensuring that when a friend relationship between terminals changes, privacy of the terminals can still be ensured.

BRIEF DESCRIPTION OF THE DRAWINGS

The accompanying drawings described here are used for providing a deeper understanding of the disclosure, and constitute a part of the application. In the accompanying drawings.

DETAILED DESCRIPTION OF THE EMBODIMENTS

The disclosure is elaborated below with reference to the accompanying drawings and embodiments. It may be appreciated that the embodiments of the disclosure and the characteristics in the embodiments may be combined under the condition of no conflicts.

Figure 1:
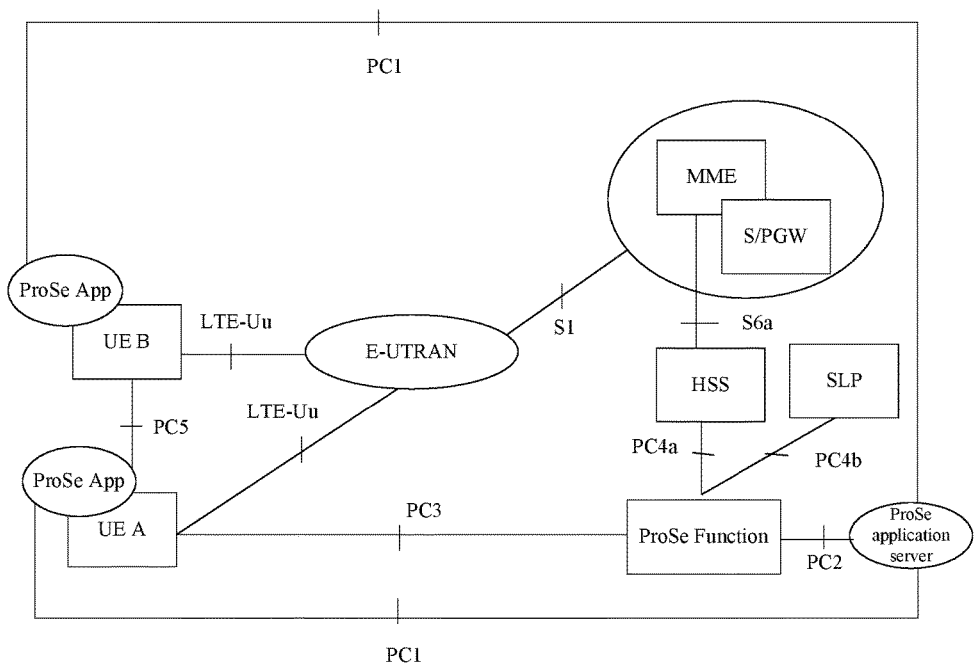
FIG. 1 is a structure diagram of main network elements after a ProSe function is introduced according to the related ProSe technology.
Figure 2:
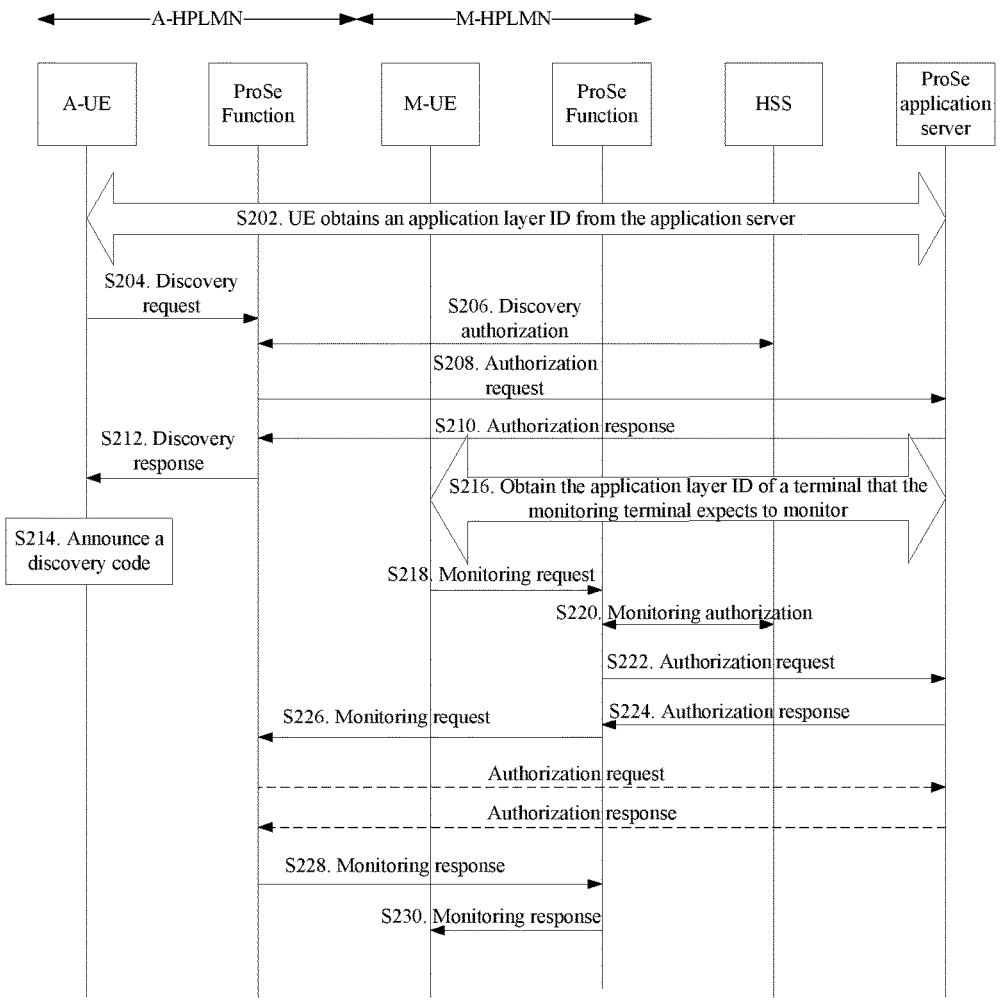
FIG. 2 is a schematic diagram of a friend discovery process of a terminal in the restrained discovery mode according to the related ProSe discovery technology.
Figure 3:
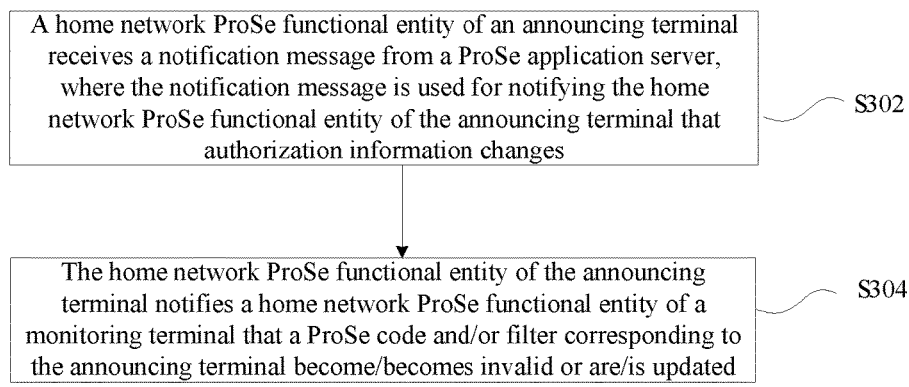
FIG. 3 is a flowchart of a method for notifying an authorization update according to an embodiment of the disclosure.

FIG. 3 is a flowchart of a method for notifying an authorization update according to an embodiment of the disclosure. As shown in FIG. 3, the method may include the following acts S302 to S304.

At act S302, a home network ProSe functional entity of an announcing terminal receives a notification message from a ProSe application server. The notification message is used for notifying the home network ProSe functional entity of the announcing terminal that authorization information changes.

At act S304, the home network ProSe functional entity of the announcing terminal notifies a home network ProSe functional entity of a monitoring terminal that a ProSe code and/or filter corresponding to the announcing terminal become/becomes invalid or are/is updated.

In a related ProSe discovery technology, privacy of terminals cannot be ensured when a friend relationship between the terminals changes. According to the method shown in FIG. 3, the ProSe application server notifies the home network ProSe functional entity of the announcing terminal that the authorization information changes, and then the home network ProSe functional entity of the announcing terminal notifies the home network ProSe functional entity of the monitoring terminal that the ProSe code and/or filter corresponding to the announcing terminal become/becomes invalid or are/is updated, so that the previous ProSe code and/or filter may be no longer used between the announcing terminals. In such a manner, the problem in a related ProSe discovery technology that privacy of terminals cannot be ensured when a friend relationship between the terminals changes is solved, thus ensuring that when a friend relationship between terminals changes, privacy of the terminals can still be ensured.

In an exemplary embodiment, the act that the home network ProSe functional entity of the announcing terminal receives the notification message from the ProSe application server in S302 may include the following operation.

S1, the home network ProSe functional entity of the announcing terminal receives the notification message from the ProSe application server. The notification message may carry, but is not restrained to: at least one of:
(1) a restrained ProSe application identifier;
(2) a ProSe discovery identifier; and
(3) a permission change indicator, where the permission change indicator is indicative of a change from permitting the announcing terminal to announce into forbidding the announcing terminal to announce.

In an exemplary embodiment, the act that home network ProSe functional entity of the announcing terminal receives the notification message from the ProSe application server in S302 may include the following operation.

S2, the home network ProSe functional entity of the announcing terminal receives the notification message from the ProSe application server. The notification message may carry, but is not restrained to, at least one of:
(1) a restrained ProSe application identifier of the announcing terminal;
(2) a ProSe discovery identifier of the announcing terminal;
(3) a restrained ProSe application identifier of the monitoring terminal;
(4) a ProSe discovery identifier of the monitoring terminal; and
(5) a permission change indicator, where the permission change indicator is indicative of a change from permitting the monitoring terminal to monitor the announcing terminal into forbidding the monitoring terminal to monitor the announcing terminal.

In an exemplary embodiment, after the home network ProSe functional entity of the announcing terminal receives the notification message from the ProSe application server in S302, the method further may further include at least one of the following operations.

S3, the home network ProSe functional entity of the announcing terminal finds the announcing terminal according to context information of the announcing terminal, and notifies the announcing terminal that the announcing terminal is forbidden to continue announcing the previous ProSe code and/or filter.

S4, the home network ProSe functional entity of the announcing terminal issues the updated ProSe code and/or filter to the announcing terminal, or, notifies that the previous ProSe code and/or filter become/becomes invalid to trigger the announcing terminal to obtain the ProSe code and/or filter again.

In an exemplary embodiment, after the home network ProSe functional entity of the announcing terminal receives the notification message from the ProSe application server in S302, the method may further include the following operations.

S5, the home network ProSe functional entity of the announcing terminal notifies a visited network ProSe functional entity of the announcing terminal that the previous ProSe code and/or filter announced by the announcing terminal have/has become invalid, and/or, sends the updated ProSe code and/or filter to the visited network ProSe functional entity of the announcing terminal.

S6, the home network ProSe functional entity of the announcing terminal receives a response message from the visited network ProSe functional entity of the announcing terminal.

In an exemplary embodiment, before the home network ProSe functional entity of the announcing terminal notifies the home network ProSe functional entity of the monitoring terminal that the ProSe code and/or filter corresponding to the announcing terminal become/becomes invalid or are/is updated in S304, the method may further include the following operation.

S7, the home network ProSe functional entity of the announcing terminal determines the home network ProSe functional entity of the monitoring terminal according to information of the monitoring terminal provided by the ProSe application server or according to recorded information of the monitoring terminal which has obtained the previous ProSe code and/or filter announced by the announcing terminal from the home network ProSe functional entity of the announcing terminal.

In an exemplary embodiment, after the home network ProSe functional entity of the announcing terminal notifies the home network ProSe functional entity of the monitoring terminal that the ProSe code and/or filter corresponding to the announcing terminal become/becomes invalid or are/is updated in S304, the method may further include at least one of the following operations.

S8, the home network ProSe functional entity of the monitoring terminal finds the monitoring terminal according to context information of the monitoring terminal, and notifies the monitoring terminal that a monitored ProSe code and/or filter have/has become invalid.

S9, the home network ProSe functional entity of the monitoring terminal notifies the updated ProSe code and/or filter to the monitoring terminal, or triggers the monitoring terminal to obtain the Pro Se code and/or filter again.

Figure 4:
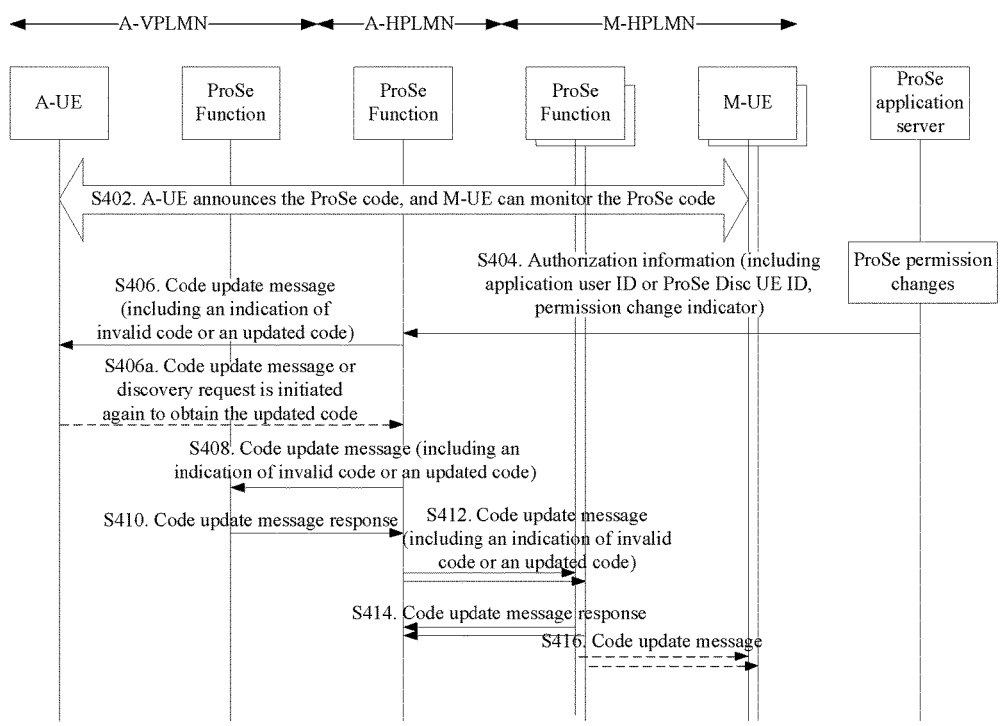
FIG. 4 is a flowchart of notifying a terminal of an update from permitting the terminal to announce into forbidding the terminal to announce according to a first exemplary embodiment of the disclosure.

FIG. 4 is a flowchart of notifying a terminal of an update from permitting the terminal to announce into forbidding the terminal to announce according to a first exemplary embodiment of the disclosure. As shown in FIG. 4, authorization for a terminal may be updated from permitting the terminal to announce its own ID to its friends into forbidding the terminal to announce its own ID to the other terminals. A common application scenario may include, but is not restrained to: a user modifies the permission through UI setting of an application; or the ProSe application server learns from an application layer that it is needed to modify the permission of the terminal. In the exemplary embodiment, such a modification is needed to be notified to the ProSe functional entity of the announcing terminal, so that the modification may be further notified to the monitoring terminal. The method may include the following acts S402 to S416.

At act S402, Announce-UE (A-UE), namely the announcing terminal, announces its own ProSe code. The A-UE's friend Monitor-UE (M-UE), namely the monitoring terminal, may monitor the ProSe code of the announcing terminal and learn that the announcing terminal is A-UE. The ProSe application server detects that the permission of the A-UE changes, and then does not permit any friend to discover the A-UE.

At act S404, the ProSe application server notifies the home network ProSe functional entity of the A-UE. The notification message may carry at least one of: the restrained ProSe application identifier, the ProSe discovery identifier, or a permission change indicator, where the permission change indicator is indicative of a change from permitting the announcing terminal to announce into forbidding the announcing terminal to announce.

Optionally, the notification message may further contain: the restrained ProSe application identifiers and/or ProSe discovery identifiers of other terminals in the friend list of the A-UE.

At acts S406-S406a, the ProSe functional entity may find the A-UE according to the context of the terminal, and notify the terminal that the terminal is forbidden to continue announcing the previous ProSe code. If there is a situation where multiple applications are associated with one and the same ProSe code, and the authorization of only one application changes, the ProSe functional entity may be suggested to allocate a new ProSe code for the terminal, so it may be suggested to notify, through the above acts, the terminal to perform code update. If the notification becomes invalid, or the updated code has been issued to the terminal through the above acts, there is no need to perform S406a; or else, the terminal may obtain the updated ProSe code by initiating S306a. The process of obtaining the code again is similar to the technical means adopted in the related technology, so it will not be repeated here.

At acts S408-S410, the home network ProSe functional entity notifies the visited network ProSe functional entity that the previous ProSe code of the A-UE has become invalid. Furthermore, if the ProSe code has been updated in the above acts, the updated ProSe code may also be notified to the visited network ProSe functional entity through these acts. The updated ProSe code may be notified to the visited network ProSe functional entity through a discovery process triggered in the above acts. The visited network ProSe functional entity returns the response message.

If only the code becomes invalid, the subsequent acts may not be performed, since the A-UE does not announce the ProSe code any more, and the M-UE cannot monitor the ProSe code. However, allowing for charge information and other problems, it is also suggested to continue performing the subsequent acts.

At acts S412-S416, the home network ProSe functional entity of the A-UE notifies the ProSe functional entity of the M-UE that the previous ProSe code becomes invalid. If the ProSe application server also provides information of other terminals in the above acts, the A-UE may notify the corresponding ProSe functional entity of the M-UE according to the information. If the ProSe application server does not provide information of other terminals in the above acts, the A-UE may notify the corresponding ProSe functional entity of the M-UE according to the recorded information of the M-UE corresponding to the ProSe code of the A-UE. Furthermore, if the ProSe code or the ProSe filter has been updated in the above acts, the updated ProSe code or filter may also be notified to the ProSe functional entity of the M-UE through these acts. The ProSe functional entity of the M-UE returns the response message.

Optionally, the ProSe functional entity of the M-UE finds the M-UE according to the context, and notifies the terminal that the monitored updated ProSe code or filter has become invalid. If the ProSe code or filter has been updated, the updated ProSe code or filter may be notified to the M-UE, or the M-UE may be notified that the ProSe code or filter has become invalid, so that the M-UE may be triggered to initiate the monitoring process to obtain the code or filter again. The process of obtaining the code or filter again is similar to the technical means adopted in the related technology, so it will not be repeated here.

It may be appreciated that there is not a fixed order between S414 and S416.

If there are multiple monitoring terminals, the process of S412-S416 may be performed on the home network ProSe functional entities of different monitoring terminals.

Figure 5:
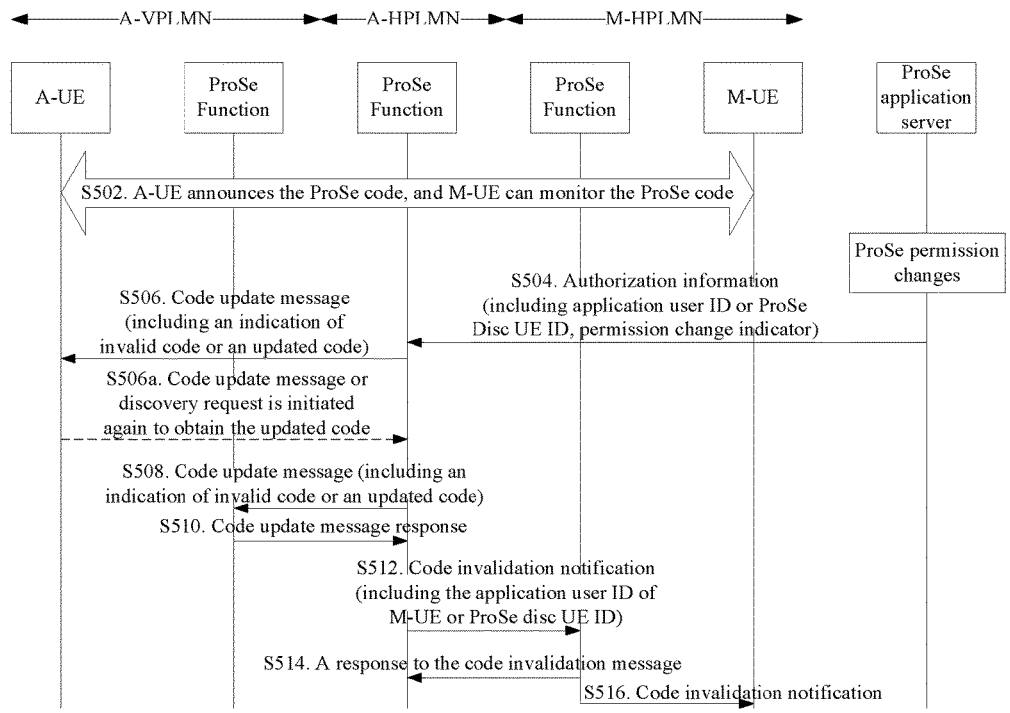
FIG. 5 is a flowchart of notifying a terminal an update from permitting the terminal to monitor announcement of a specific terminal into forbidding the terminal to monitor according to a first exemplary embodiment of the disclosure.

FIG. 5 is a flowchart of notifying a terminal an update from permitting the terminal to monitor announcement of a specific terminal into forbidding the terminal to monitor according to a first exemplary embodiment of the disclosure. As shown in FIG. 5, the authorization for a terminal may be updated from permitting the terminal to monitor the announcement of a specific friend to forbidding the terminal to monitor the announcement of the friend. A common application scenario may include, but is not restrained to: an announcing terminal user or a monitoring terminal user may modify the permission through the UI setting of the application; or the ProSe application server learns from the application layer that it is needed to modify the permission of the terminal. In the exemplary embodiment, such a modification may be notified to the ProSe functional entity of the announcing terminal.

At act S502, the A-UE, namely the announcing terminal, announces its own ProSe code. A friend M-UE of the A-UE, namely the monitoring terminal, may monitor the ProSe code of the announcing terminal and learn that the announcing terminal is the A-UE. The ProSe application server detects that the permission of the M-UE changes, and then does not permit the M-UE to discover the A-UE.

At act S504, the ProSe application server notifies the home network ProSe functional entity of the A-UE. The notification message may carry at least one of: a restrained ProSe application identifier of the A-UE, a ProSe discovery identifier, a restrained ProSe application identifier of the M-UE, a ProSe discovery identifier, or a permission change indicator, where the permission change indicator may be indicative of a change from permitting the M-UE to monitor the A-UE into forbidding the M-UE to monitor the A-UE.

At acts S506-S506a, in order to ensure the privacy, it may be suggested to change the ProSe code immediately, so as to ensure that the A-UE cannot be monitored by an invalid user. However, if the ProSe functional entity of the M-UE can notify the M-UE and ensure that the M-UE does not continue monitoring the A-UE, it may be more feasible to not change the ProSe code, that is, S506-S508 are not performed. An elaboration is given here by taking that acts S506-S508 are performed for example.

The ProSe functional entity may find the A-UE according to the context of the terminal, and notifies the terminal that the terminal is forbidden to continue announcing the previous ProSe code. If there is a situation where multiple applications are associated with one and the same ProSe code, and the authorization of only one application changes, the ProSe functional entity may be suggested to re-allocate a ProSe code for the terminal, so it may be suggested to notify, through the above acts, the terminal to perform code update. If the notification becomes invalid, or the updated code has been issued to the terminal through the above acts, there is no need to perform S506a; or else, the terminal may obtain the updated ProSe code by initiating S506a. The process of obtaining the code again is similar to the technical means adopted in the related technology, so it will not be repeated here.

At acts S508-S510, the home network ProSe functional entity notifies the visited network ProSe functional entity that the previous ProSe code of the A-UE has become invalid. Furthermore, if the ProSe code has been updated in the above acts, the updated ProSe code may also be notified to the visited network ProSe functional entity through these acts. The updated ProSe code may be notified to the visited network ProSe functional entity through the discovery process triggered in the above acts. The visited network ProSe functional entity returns the response message.

If only the code becomes invalid, it may be suggested to perform the subsequent acts, and the invalid M-UE may be notified. If the code is updated, the ProSe functional entity of the A-UE may identify the other associated M-UE to the ProSe application which monitored the specific authorization of the A-UE. If there are multiple pieces of M-UE, the operation is performed for multiple times.

At acts S512-S516, the home network ProSe functional entity of the A-UE notifies the ProSe functional entity of the M-UE that the previous ProSe code becomes invalid. The ProSe functional entity of A-UE may notify the corresponding ProSe functional entity of the M-UE according to the information of the M-UE in the above acts. Furthermore, if the ProSe code or the ProSe filter has been updated in the above acts, the updated ProSe code or filter may also be notified to the ProSe functional entity of the M-UE through these acts. The ProSe functional entity of the M-UE returns the response message.

Optionally, the ProSe functional entity of the M-UE may find the M-UE according to the context, and notifies the terminal that the monitored updated ProSe code or filter has become invalid. If the ProSe code or filter has been updated, the updated ProSe code or filter may be notified to the M-UE through S516, or the M-UE may be notified that the ProSe code or filter has become invalid, so that the M-UE may be triggered to initiate the monitoring process to obtain the code or filter again. The process of obtaining the code or filter again is similar to the technical means adopted in the related technology, so it will not be repeated here.

It may be appreciated that there is not a fixed order between S514 and S516.

Figure 6:
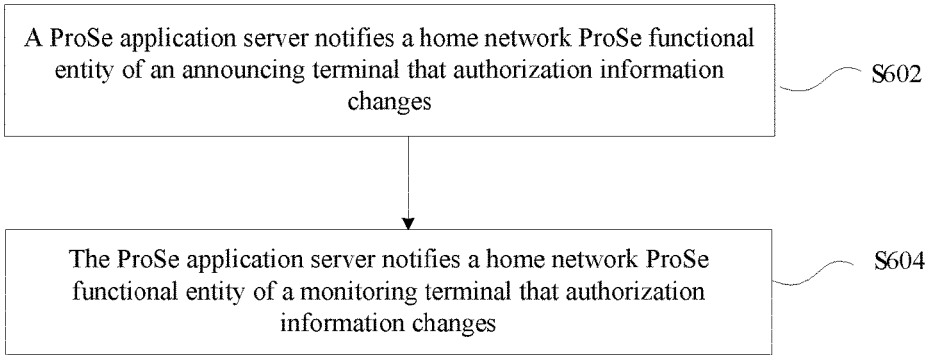
FIG. 6 is a flowchart of another method for notifying an authorization update according to an embodiment of the disclosure.

FIG. 6 is a flowchart of another method for notifying an authorization update according to an embodiment of the disclosure. As shown in FIG. 6, the method for notifying an authorization update may include the following acts S602 to S604.

At act S602, the ProSe application server notifies the home network ProSe functional entity of the announcing terminal that the authorization information changes.

At act S604, the ProSe application server notifies the home network ProSe functional entity of the monitoring terminal that the authorization information changes.

In an exemplary embodiment, the act that the ProSe application server notifies the home network ProSe functional entity of the announcing terminal that the authorization information changes in S602 may include the following operations.

S10, the ProSe application server sends the notification message to the home network ProSe functional entity of the announcing terminal. The notification message may carry, but is not restrained to, at least one of:

(1) a restrained ProSe application identifier;

(2) a ProSe discovery identifier; and (3) a permission change indicator, where the permission change indicator is indicative of a change from permitting the announcing terminal to announce into forbidding the announcing terminal to announce.

In an exemplary embodiment, the act that the ProSe application server notifies the home network ProSe functional entity of the announcing terminal that the authorization information changes in S602 may include the following acts.

S11, the ProSe application server sends the notification message to the home network ProSe functional entity of the announcing terminal. The notification message may carry, but is not restrained to, at least one of:

(1) a restrained ProSe application identifier of the announcing terminal;

(2) a ProSe discovery identifier of the announcing terminal;

(3) a restrained ProSe application identifier of the monitoring terminal;

(4) a ProSe discovery identifier of the monitoring terminal; and (5) a permission change indicator, where the permission change indicator is indicative of a change from permitting the monitoring terminal to monitor the announcing terminal into forbidding the monitoring terminal to monitor the announcing terminal.

In an exemplary embodiment, after the ProSe application server notifies the home network ProSe functional entity of the announcing terminal that the authorization information changes in act S602, the method may further include at least one of the following operations.

S12, the home network ProSe functional entity of the announcing terminal finds the announcing terminal according to context information of the announcing terminal, and notifies the announcing terminal that the announcing terminal is forbidden to continue announcing the previous ProSe code and/or filter.

S13, the home network ProSe functional entity of the announcing terminal issues the updated ProSe code and/or filter to the announcing terminal, or, notifies that the previous ProSe code and/or filter become/becomes invalid to trigger the announcing terminal to obtain the ProSe code and/or filter again.

In an exemplary embodiment, after the ProSe application server notifies the home network ProSe functional entity of the announcing terminal that the authorization information changes in act S602, the method may further include the following acts.

S14, the home network ProSe functional entity of the announcing terminal notifies the visited network ProSe functional entity of the announcing terminal that the previous ProSe code and/or filter announced by the announcing terminal have/has become invalid, and/or, sends the updated ProSe code and/or filter to the visited network ProSe functional entity of the announcing terminal.

S15, the home network ProSe functional entity of the announcing terminal receives the response message from the visited network ProSe functional entity of the announcing terminal.

In an exemplary embodiment, the act that the ProSe application server notifies the home network ProSe functional entity of the monitoring terminal that the authorization information changes in S604 may include the following operation.

S16, the ProSe application server sends the notification message to the home network ProSe functional entity of the monitoring terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the announcing terminal to announce into forbidding the announcing terminal to announce.

In an exemplary embodiment, the act that the ProSe application server notifies the home network ProSe functional entity of the monitoring terminal that the authorization information changes in S604 may include the following operation.

S17, the ProSe application server sends the notification message to the home network ProSe functional entity of the monitoring terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

In an exemplary embodiment, after the ProSe application server notifies the home network ProSe functional entity of the monitoring terminal that the authorization information changes in act S604, the method may further include the following operation.

S18, the monitoring terminal finds the ProSe code and/or filter which are/is monitored by the monitoring terminal and have/has become invalid according to the notification message and the local context information.

In an exemplary embodiment, after the ProSe application server notifies the home network ProSe functional entity of the monitoring terminal that the authorization information changes in act S604, the method may further include at least one of the following operations.

S19, the home network ProSe functional entity of the monitoring terminal finds the monitoring terminal according to context information of the monitoring terminal, and notifies the monitoring terminal that a monitored ProSe code and/or filter have/has become invalid.

S20, the home network ProSe functional entity of the monitoring terminal triggers the monitoring terminal to obtain the Pro Se code and/or filter again.

Figure 7:
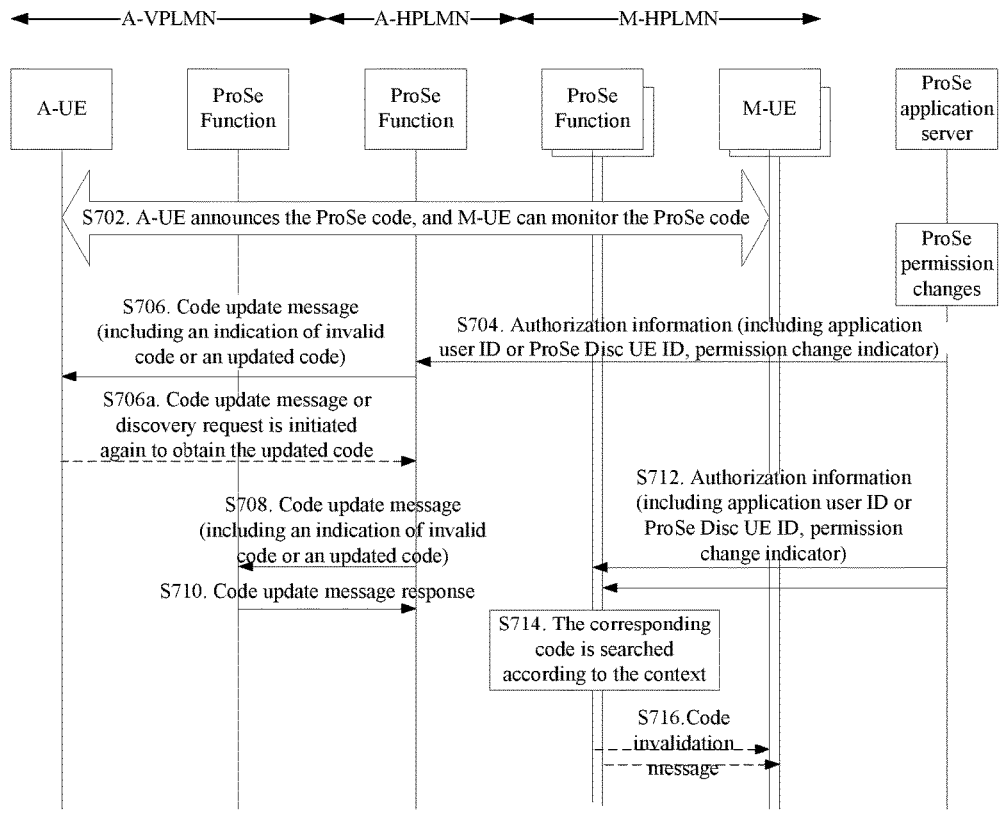
FIG. 7 is a flowchart of notifying an announcing terminal of an update from permitting the terminal to announce into forbidding the terminal to announce according to a second exemplary embodiment of the disclosure.

FIG. 7 is a flowchart of notifying an announcing terminal of an update from permitting the terminal to announce into forbidding the terminal to announce according to a second exemplary embodiment of the disclosure. As shown in FIG. 7, authorization for a terminal may be updated from permitting the terminal to announce its ID to its friend into forbidding the terminal to announce its ID to the other terminals. A common application scenario may include, but is not restrained to: a user may modify the permission through the UI setting of the application; or the ProSe application server learns from the application layer that it is needed to modify the permission of the terminal. In the exemplary embodiment, such a modification may be notified to the ProSe functional entity of the announcing terminal and the ProSe functional entity of the monitoring terminal at the same time.

At act S702, the A-UE, namely the announcing terminal, announces its own ProSe code. A friend M-UE of the A-UE, namely the monitoring terminal, may monitor the ProSe code of the announcing terminal and learn that the announcing terminal is the A-UE. The ProSe application server detects that the permission of the A-UE changes, and then does not permit any friend to discover the A-UE.

At act S704, the ProSe application server notifies the home network ProSe functional entity of the A-UE. The notification message may carry at least one of: a restrained ProSe application identifier, a ProSe discovery identifier, or a permission change indicator, where the permission change indicator is indicative of a change from permitting the announcing terminal to announce into forbidding the announcing terminal to announce.

At acts S706-S706a, the ProSe functional entity may find the A-UE according to the context of the terminal, and notify the terminal that the terminal is forbidden to continue announcing the previous ProSe code. If there is a situation where multiple applications are associated with one and the same ProSe code, and the authorization of only one application changes, the ProSe functional entity may be suggested to re-allocate a ProSe code for the terminal, so it may be suggested to notify, through the above acts, the terminal to perform code update. If the notification becomes invalid, or the updated code has been issued to the terminal through the above acts, there is no need to perform S706a; or else, the terminal may obtain the updated ProSe code by initiating S706a. The process of obtaining the code again is similar to the technical means adopted in the related technology, so it will not be repeated here.

At acts S708-S710, the home network ProSe functional entity notifies the visited network ProSe functional entity that the previous ProSe code of the A-UE has become invalid. Furthermore, if the ProSe code has been updated in the above acts, the updated ProSe code may also be notified to the visited network ProSe functional entity through these acts. The updated ProSe code may be notified to the visited network ProSe functional entity through the discovery process triggered in the above acts. The visited network ProSe functional entity returns the response message.

At act S712, the ProSe application server notifies the home network ProSe functional entity of the M-UE. The notification message may carry at least one of: a restrained ProSe application identifier of the M-UE, a ProSe discovery identifier, a restrained ProSe application identifier of the A-UE, a ProSe discovery identifier, or a permission change indicator, where the permission change indicator is indicative of a change from permitting the A-UE to announce into forbidding the A-UE to announce.

At acts S714-S716, the M-UE may find the ProSe code or filter which is monitored by the M-UE and has become invalid according to the local context and the identifier carried in the above act. Optionally, the ProSe functional entity of the M-UE notifies that the ProSe code or filter which is monitored by the terminal has become invalid, so that the M-UE may be triggered to initiate the monitoring process to obtain the code or filter again. The process of obtaining the code or filter again is similar to the technical means adopted in the related technology, so it will not be repeated here.

If there are multiple monitoring terminals, the process of S712-S716 may be performed on the home network ProSe functional entities of different monitoring terminals.

Figure 8:
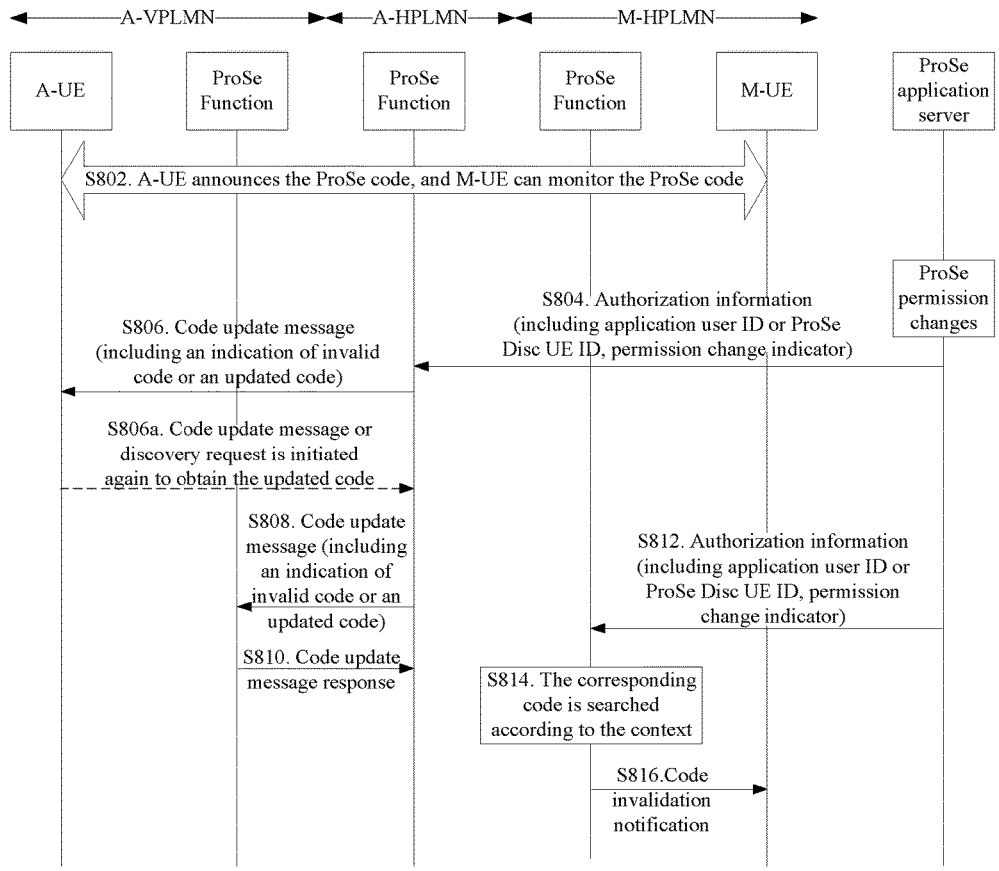
FIG. 8 is a flowchart of notifying a terminal an update from permitting the terminal to monitor announcement of a specific terminal into forbidding the terminal to monitor according to a second exemplary embodiment of the disclosure.

FIG. 8 is a flowchart of notifying a terminal an update from permitting the terminal to monitor announcement of a specific terminal into forbidding the terminal to monitor according to a second exemplary embodiment of the disclosure. As shown in FIG. 8, the authorization for a terminal may be updated from permitting the terminal to monitor the announcement of a specific friend into forbidding the terminal to monitor the announcement of the friend. A common application scenario may include, but is not restrained to: the announcing terminal user or the monitoring terminal user may modify the permission through the UI setting of the application; or the ProSe application server learns from the application layer that it is needed to modify the permission of the terminal. In the exemplary embodiment, such a modification may be notified to the ProSe functional entity of the announcing terminal and the ProSe functional entity of the monitoring terminal at the same time.

At act S802, the A-UE, namely the announcing terminal, announces its own ProSe code. A friend M-UE of the A-UE, namely the monitoring terminal, may monitor the ProSe code of the announcing terminal and learn that the announcing terminal is the A-UE. The ProSe application server detects that the permission of the M-UE changes, and then does not permit the M-UE to discover the A-UE.

At act S804, the ProSe application server notifies the home network ProSe functional entity of the A-UE. The notification message may carry at least one of: a restrained ProSe application identifier of the A-UE, a ProSe discovery identifier, a restrained ProSe application identifier of the M-UE, a ProSe discovery identifier, or a permission change indicator, where the permission change indicator is indicative of a change from permitting the M-UE to monitor the M-UE into forbidding the M-UE to monitor.

At acts S806-S806a, in order to ensure the privacy, it may be suggested to change the ProSe code immediately, so as to ensure that the A-UE cannot be monitored by an invalid user. However, if the ProSe functional entity of the M-UE can notify the M-UE and ensure that the M-UE does not continue monitoring the A-UE, it may be more feasible to not change the ProSe code, that is, S806-S810 are not performed. An elaboration is given here by taking that S806-S810 are performed for example.

The ProSe functional entity may find the A-UE according to the context of the terminal, and notifies the terminal that the terminal is forbidden to continue announcing the previous ProSe code. If there is a situation where multiple applications are associated with one and the same ProSe code, and the authorization of only one application changes, the ProSe functional entity may be suggested to re-allocate a ProSe code for the terminal, so it may be suggested to notify, through the above acts, the terminal to perform code update. If the notification becomes invalid, or the updated code has been issued to the terminal through the above acts, there is no need to perform S806a; or else, the terminal may obtain the updated ProSe code by initiating S806a. The process of obtaining the code again is similar to the technical means adopted in the related technology, so it will not be repeated here.

At acts S808-S810, the home network ProSe functional entity notifies the visited network ProSe functional entity that the previous ProSe code of the A-UE has become invalid. Furthermore, if the ProSe code has been updated in S806, the updated ProSe code may also be notified to the visited network ProSe functional entity through these acts. The updated ProSe code may be notified to the visited network ProSe functional entity through the discovery process triggered in S806a. The visited network ProSe functional entity returns the response message.

At act S812, the ProSe application server notifies the home network ProSe functional entity of the M-UE. The notification message may carry at least one of: a restrained ProSe application identifier of the M-UE, a ProSe discovery identifier, a restrained ProSe application identifier of the A-UE, a ProSe discovery identifier, or a permission change indicator, where the permission change indicator is indicative of a change from permitting the M-UE to monitor the A-UE into forbidding the M-UE to monitor the A-UE.

At acts S814-S816, the M-UE may find the ProSe code or filter which is monitored by the M-UE and has become invalid according to the local context and the identifier carried in the above act. Optionally, the ProSe functional entity of the M-UE notifies that the ProSe code or filter which is monitored by the terminal has become invalid, so that the M-UE may be triggered to initiate the monitoring process to obtain the code or filter again. The process of obtaining the code or filter again is similar to the technical means adopted in the related technology, so it will not be repeated here.

Figure 9:
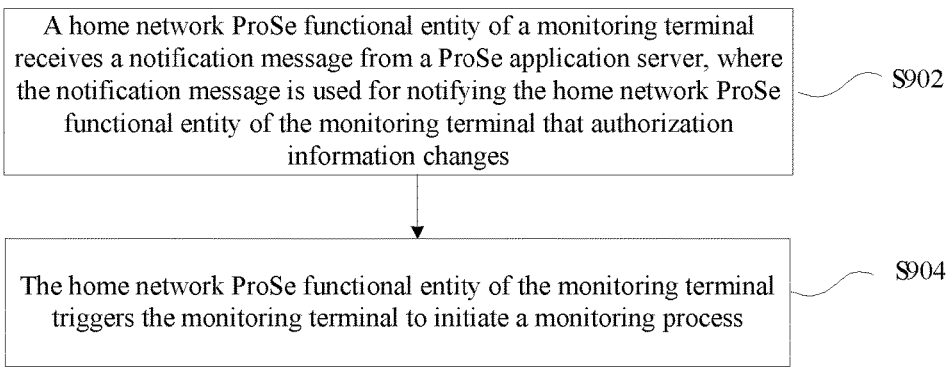
FIG. 9 is a flowchart of another method for notifying an authorization update according to an embodiment of the disclosure.

FIG. 9 is a flowchart of another method for notifying an authorization update according to an embodiment of the disclosure. As shown in FIG. 9, the method for notifying an authorization update may include the following acts S902 to S904.

At act S902, the home network ProSe functional entity of the monitoring terminal receives the notification message from the ProSe application server. The notification message is used for notifying the home network ProSe functional entity of the monitoring terminal that the authorization information changes.

At act S904, the home network ProSe functional entity of the monitoring terminal triggers the monitoring terminal to initiate the monitoring process.

In an exemplary embodiment, the act that the home network ProSe functional entity of the monitoring terminal receives the notification message from the ProSe application server in S902 may include the following operations.

S21, the home network ProSe functional entity of the monitoring terminal receives the notification message from the ProSe application server. The notification message may carry, but is not restrained to: at least one of:

(1) a restrained ProSe application identifier of the announcing terminal;

(2) a ProSe discovery identifier of the announcing terminal;

(3) a restrained ProSe application identifier of the monitoring terminal;

(4) a ProSe discovery identifier of the monitoring terminal; and (5) a permission change indicator, where the permission change indicator is indicative of a change from permitting the monitoring terminal to monitor the announcing terminal into forbidding the monitoring terminal to monitor the announcing terminal.

In an exemplary embodiment, before the home network ProSe functional entity of the monitoring terminal triggers the monitoring terminal to initiate the monitoring process in act S904, the method may also include the following operations.

S22, the home network ProSe functional entity of the monitoring terminal determines that the monitoring terminal once triggered a monitoring request but the monitoring request was refused.

S23, the home network ProSe functional entity of the monitoring terminal notifies the monitoring terminal to obtain the ProSe code and/or filter of the announcing terminal again.

In an exemplary embodiment, the act that the home network ProSe functional entity of the monitoring terminal triggers the monitoring terminal to initiate the monitoring process in S904 may include the following operation.

S24, the home network ProSe functional entity of the monitoring terminal notifies the monitoring terminal to monitor, according to a restrained ProSe application identifier of the announcing terminal, announcement performed by the announcing terminal. The restrained ProSe application identifier of the announcing terminal is used for the monitoring terminal to obtain an application layer ID of the announcing terminal.

Figure 10:
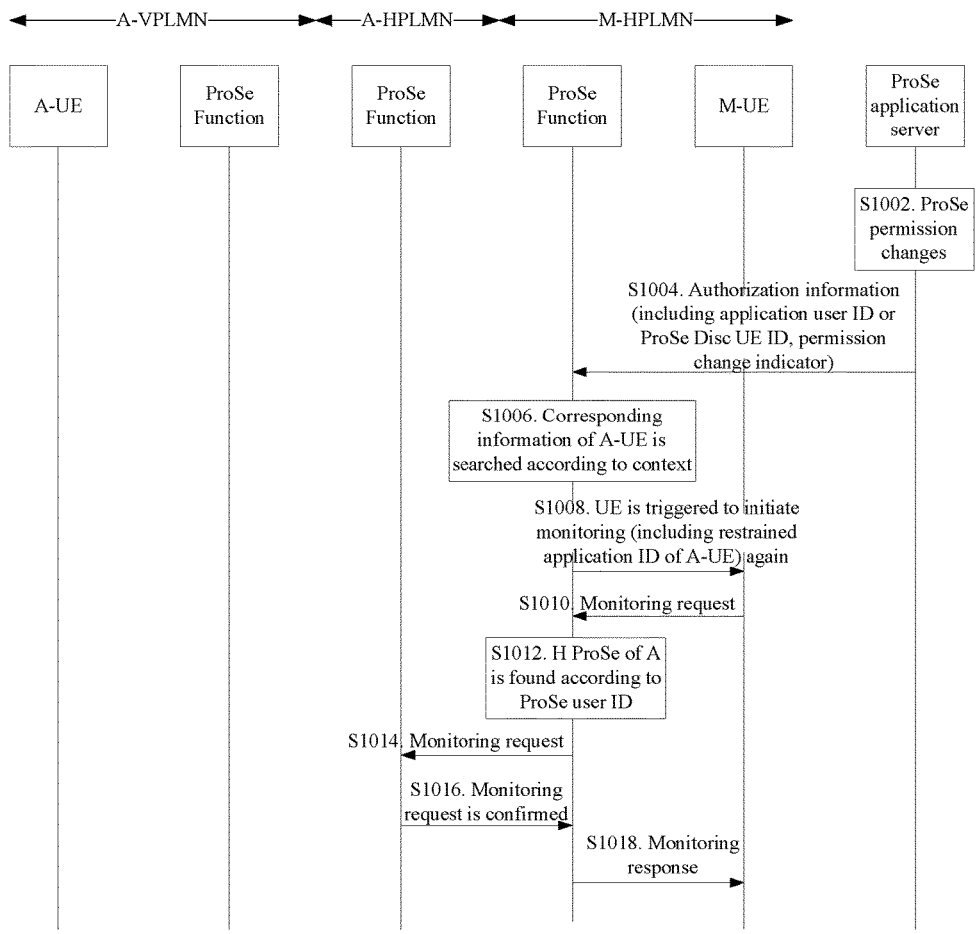
FIG. 10 is a flowchart of triggering a terminal to monitor according to an exemplary embodiment of the disclosure.

FIG. 10 is a flowchart of triggering a terminal to monitor according to an exemplary embodiment of the disclosure. As shown in FIG. 10, authorization for a terminal may be updated from permitting the terminal to monitor the announcement of a specific friend into forbidding the terminal to monitor the announcement of the friend. A common application scenario may include, but is not restrained to: the announcing terminal user or the monitoring terminal user may modify the permission through the UI setting of the application; or the ProSe application server learns from the application layer that it is needed to modify the permission of the terminal. In the exemplary embodiment, such a modification may be notified to the ProSe functional entity of the announcing terminal.

Moreover, the exemplary embodiment may also be applied to the following scenario: the M-UE requests to monitor the A-UE, but the A-UE is not online. After the A-UE gets online, the ProSe application server may also trigger the M-UE to monitor the announcement of the A-UE through the flow.

At act S1002, the ProSe application server records that the M-UE applied to monitor the A-UE but was refused according to previously saved query information of the terminal; or the ProSe application server detects that the M-UE is added in the friend list of the A-UE.

At act S1004, the ProSe application server may notify the home network ProSe functional entity of the M-UE. The notification message may carry at least one of: a restrained ProSe application identifier of the M-UE, a ProSe discovery identifier, a restrained ProSe application identifier of the A-UE, a ProSe discovery identifier, or a permission change indicator, where the permission change indicator is indicative of a change from forbidding the M-UE to monitor the A-UE to permitting the M-UE to monitor the A-UE.

At act S1006, the ProSe functional entity of the M-UE may find according to the context whether the M-UE has initiated the monitoring request. If the M-UE does not request to monitor the A-UE, it may be feasible to not perform the subsequent acts. If the M-UE has performed monitoring but the monitoring request is refused (the reason may include, but is not restrained to, that the application layer does not permit the monitoring operation, or the A-UE is not online and does not generate the restrained ProSe application identifier), the M-UE may be notified to obtain the ProSe code or filter of the A-UE again.

At acts S1008-S1018, the ProSe functional entity notifies the terminal that the announcement of the specific terminal may be monitored. The notification message may carry at least one of: a restrained ProSe application identifier of the A-UE. The M-UE may obtain the application layer ID of the A-UE from the application layer through the identifier, so as to decide whether to perform the subsequent acts.

When the monitored ProSe code or filter has become invalid, the notification may trigger the M-UE to initiate the monitoring process to obtain the code or filter again. The process of obtaining the code or filter again is similar to the technical means adopted in the related technology, so it will not be repeated here.

Figure 11:
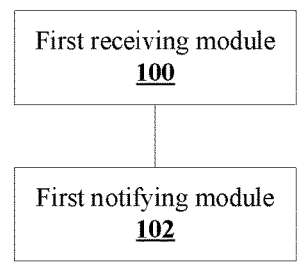
FIG. 11 is a structure diagram of a device for notifying an authorization update according to an embodiment of the disclosure.

FIG. 11 is a structure diagram of a device for notifying an authorization update according to an embodiment of the disclosure. The device may be located in the home network ProSe functional entity of the announcing terminal. As shown in FIG. 11, the device for notifying an authorization update may include: a first receiving module 100, which is arranged to receive the notification message from the ProSe application server, where the notification message is used for notifying the home network ProSe functional entity of the announcing terminal that the authorization information changes; and a first notifying module 102, which is arranged to notify the home network ProSe functional entity of the monitoring terminal that the ProSe code and/or filter corresponding to the announcing terminal become/becomes invalid or are/is updated.

By virtue of the device shown in FIG. 11, the problem in a related ProSe discovery technology that privacy of terminals cannot be ensured when a friend relationship between the terminals changes is solved, thus ensuring that when a friend relationship between terminals changes, privacy of the terminals can still be ensured.

In an exemplary embodiment, the first receiving module 100 may be arranged to receive the notification message from the ProSe application server. The notification message may carry at least one of: a restrained ProSe application identifier, a ProSe discovery identifier, or a permission change indicator, where the permission change indicator is indicative of a change from permitting the announcing terminal to announce into forbidding the announcing terminal to announce.

In an exemplary embodiment, the first receiving module 100 may be arranged to receive the notification message from the ProSe application server. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

Figure 12:
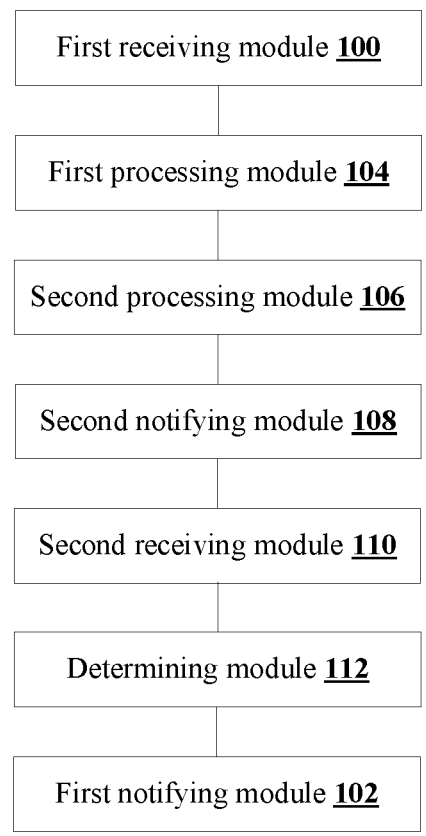
FIG. 12 is a structure diagram of a device for notifying an authorization update according to an exemplary embodiment of the disclosure.

In an exemplary embodiment, as shown in FIG. 12, the device may further include: a first processing module 104, which is arranged to find the announcing terminal according to context information of the announcing terminal, and notify the announcing terminal that the announcing terminal is forbidden to continue announcing the previous ProSe code and/or filter; and/or, a second processing module 106, which is arranged to issue the updated ProSe code and/or filter to the announcing terminal, or, notify that the previous ProSe code and/or filter become/becomes invalid to trigger the announcing terminal to obtain the ProSe code and/or filter again.

In an exemplary embodiment, as shown in FIG. 12, the device may further include: a second notifying module 108, which is arranged to notify the visited network ProSe functional entity of the announcing terminal that the previous ProSe code and/or filter announced by the announcing terminal have/has become invalid, and/or, send the updated ProSe code and/or filter to the visited network ProSe functional entity of the announcing terminal; and a second receiving module 110, which is arranged to receive the response message from the visited network ProSe functional entity of the announcing terminal.

In an exemplary embodiment, as shown in FIG. 12, the device may further include: a determining module 112, which is arranged to determine the home network ProSe functional entity of the monitoring terminal according to the information of the monitoring terminal provided by the ProSe application server or according to the recorded information of the monitoring terminal which has obtained the previous ProSe code and/or filter announced by the announcing terminal from the home network ProSe functional entity of the announcing terminal.

Figure 13:
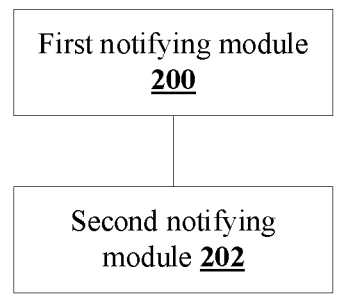
FIG. 13 is a structure diagram of another device for notifying an authorization update according to an embodiment of the disclosure.

FIG. 13 is a structure diagram of another device for notifying an authorization update according to an embodiment of the disclosure. The device may be located in the ProSe application server and may include: a first notifying module 200, which is arranged to notify the home network ProSe functional entity of the announcing terminal that the authorization information changes; and a second notifying module 202, which is arranged to notify the home network ProSe functional entity of the monitoring terminal that the authorization information changes.

In an exemplary embodiment, the first notifying module 200 is arranged to send the notification message to the home network ProSe functional entity of the announcing terminal. The notification message may carry at least one of: the restrained ProSe application identifier, the ProSe discovery identifier, or a permission change indicator, where the permission change indicator is indicative of a change from permitting the announcing terminal to announce into forbidding the announcing terminal to announce.

In an exemplary embodiment, the first notifying module 200 is arranged to send the notification message to the home network ProSe functional entity of the announcing terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

In an exemplary embodiment, the second notifying module 202 is arranged to send the notification message to the home network ProSe functional entity of the monitoring terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the announcing terminal to announce into forbidding the announcing terminal to announce.

In an exemplary embodiment, the second notifying module 202 is arranged to send the notification message to the home network ProSe functional entity of the monitoring terminal. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

Figure 14:
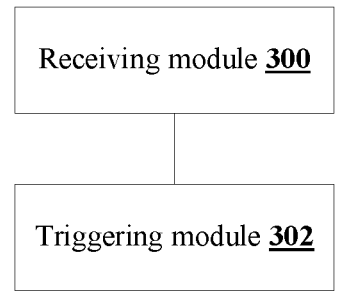
FIG. 14 is a structure diagram of another device for notifying an authorization update according to an embodiment of the disclosure.

FIG. 14 is a structure diagram of another device for notifying an authorization update according to an embodiment of the disclosure. The device may be located in the home network ProSe functional entity of the monitoring terminal. As shown in FIG. 14, the device for notifying an authorization update may include: a receiving module 300, which is arranged to receive the notification message from the ProSe application server, where the notification message is used for notifying the home network ProSe functional entity of the monitoring terminal that the authorization information changes; and a triggering module 302, which is arranged to trigger the monitoring terminal to initiate a monitoring process.

In an exemplary embodiment, the receiving module 300 is arranged to receive the notification message from the ProSe application server. The notification message may carry at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

Figure 15:
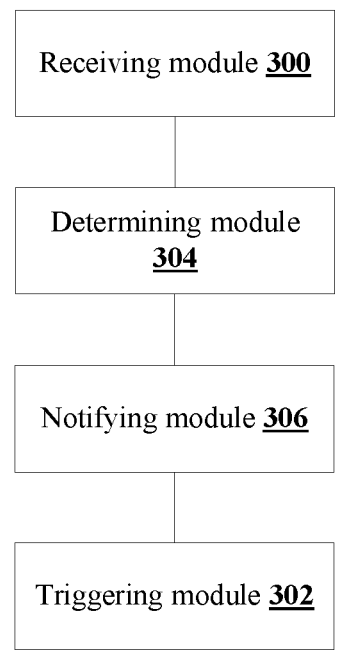
FIG. 15 is a structure diagram of another device for notifying an authorization update according to an exemplary embodiment of the disclosure.

In an exemplary embodiment, as shown in FIG. 15, the device may further include: a determining module 304, which is arranged to determine that the monitoring terminal once triggered a monitoring request but the monitoring request was refused; and a notifying module 306, which is arranged to notify the monitoring terminal to obtain the ProSe code and/or filter of the announcing terminal again.

In an exemplary embodiment, the triggering module 302 is arranged to notify the monitoring terminal to monitor the announcement performed by the announcing terminal according to the restrained ProSe application identifier of the announcing terminal. The restrained ProSe application identifier of the announcing terminal is used for the monitoring terminal to obtain the application layer identifier of the announcing terminal.

It can be seen from the above description that the above embodiments achieve the following technical effects (it may be appreciated that these effects may be achieved by some exemplary embodiments). By adopting the technical solution provided in the embodiments of the disclosure, privacy of terminals can still be ensured even when a friend relationship between the terminals changes.

Obviously, those skilled in the art should appreciate that the above modules and acts of the disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; and in some situations, the presented or described acts may be executed in an order different from that described here; or they are made into integrated circuit modules, respectively; or multiple modules and acts of them are made into a single integrated circuit module to realize. In this way, the disclosure is not limited to any particular combination of hardware and software.

The above is only the exemplary embodiment of the disclosure and not intended to limit the disclosure; for those skilled in the art, the disclosure may have various modifications and changes. Any modifications, equivalent replacements, improvements and the like within the principle of the disclosure shall fall within the scope of protection defined by the appended claims of the disclosure.

INDUSTRIAL APPLICABILITY

As mentioned above, the methods and devices for notifying an authorization update have the following beneficial effects: when a friend relationship between terminals changes, privacy of the terminals can still be ensured.

What is claimed is:

1. A method for notifying an authorization update, comprising:
   receiving, by a home network Proximity-based Services (ProSe) functional entity of an announcing terminal, a notification message from a ProSe application server, wherein the notification message is used for notifying the home network ProSe functional entity of the announcing terminal that authorization information changes; and
   notifying, by the home network ProSe functional entity of the announcing terminal, a home network ProSe functional entity of a monitoring terminal that a ProSe code and/or filter corresponding to the announcing terminal become/becomes invalid or are/is updated;
   wherein after notifying, by the home network ProSe functional entity of the announcing terminal, the home network ProSe functional entity of the monitoring terminal that the ProSe code and/or filter corresponding to the announcing terminal become/becomes invalid or are/is updated, the method further comprises: finding, by the home network ProSe functional entity of the monitoring terminal, the monitoring terminal according to context information of the monitoring terminal, and notifying, by the home network ProSe functional entity of the monitoring terminal, the monitoring terminal that a monitored ProSe code and/or filter have/has become invalid; and/or, notifying, by the home network ProSe functional entity of the monitoring terminal, the updated ProSe code and/or filter to the monitoring terminal, or triggering, by the home network ProSe functional entity of the monitoring terminal, the monitoring terminal to obtain the ProSe code and/or filter again.

2. The method as claimed in claim 1, wherein receiving, by the home network ProSe functional entity of the announcing terminal, the notification message from the ProSe application server comprises:
   receiving, by the home network ProSe functional entity of the announcing terminal, the notification message from the ProSe application server, wherein the notification message carries at least one of: a restrained ProSe application identifier, a ProSe discovery identifier, or a permission change indicator, where the permission change indicator is indicative of a change from permitting the announcing terminal to announce into forbidding the announcing terminal to announce.

3. The method as claimed in claim 1, wherein receiving, by the home network ProSe functional entity of the announcing terminal, the notification message from the ProSe application server comprises:
   receiving, by the home network ProSe functional entity of the announcing terminal, the notification message from the ProSe application server, wherein the notification message carries at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

4. The method as claimed in claim 2, wherein after receiving, by the home network ProSe functional entity of the announcing terminal, the notification message from the ProSe application server, the method further comprises:
- finding, by the home network ProSe functional entity of the announcing terminal, the announcing terminal according to context information of the announcing terminal, and notifying, by the home network ProSe functional entity of the announcing terminal, the announcing terminal that the announcing terminal is forbidden to continue announcing the previous ProSe code and/or filter;

and/or,
- issuing, by the home network ProSe functional entity of the announcing terminal, the updated ProSe code and/or filter to the announcing terminal, or, notifying, by the home network ProSe functional entity of the announcing terminal, that the previous ProSe code and/or filter become/becomes invalid to trigger the announcing terminal to obtain the ProSe code and/or filter again.

5. The method as claimed in claim 2, wherein after receiving, by the home network ProSe functional entity of the announcing terminal, the notification message from the ProSe application server, the method further comprises:
- notifying, by the home network ProSe functional entity of the announcing terminal, a visited network ProSe functional entity of the announcing terminal that the previous ProSe code and/or filter announced by the announcing terminal have/has become invalid, and/or, sending, by the home network ProSe functional entity of the announcing terminal, the updated ProSe code and/or filter to the visited network ProSe functional entity of the announcing terminal; and
- receiving, by the home network ProSe functional entity of the announcing terminal, a response message from the visited network ProSe functional entity of the announcing terminal.

6. A method for notifying an authorization update, comprising:
- receiving, by a home network Proximity-based Services (ProSe) functional entity of a monitoring terminal, a notification message from a ProSe application server, wherein the notification message is used for notifying the home network ProSe functional entity of the monitoring terminal that authorization information changes; and
- triggering, by the home network ProSe functional entity of the monitoring terminal, the monitoring terminal to initiate a monitoring process;
- wherein receiving, by the home network ProSe functional entity of the monitoring terminal, the notification message from the ProSe application server comprises: receiving, by the home network ProSe functional entity of the monitoring terminal, the notification message from the ProSe application server, wherein the notification message carries at least one of: a restrained ProSe application identifier of an announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

7. The method as claimed in claim 6, wherein before triggering, by the home network ProSe functional entity of the monitoring terminal, the monitoring terminal to initiate the monitoring process, the method further comprises:
- determining, by the home network ProSe functional entity of the monitoring terminal, that the monitoring terminal once triggered a monitoring request but the monitoring request was refused; and
- notifying, by the home network ProSe functional entity of the monitoring terminal, the monitoring terminal to obtain a ProSe code and/or filter of the announcing terminal again.

8. The method as claimed in claim 6, wherein triggering, by the home network ProSe functional entity of the monitoring terminal, the monitoring terminal to initiate the monitoring process comprises:
- notifying, by the home network ProSe functional entity of the monitoring terminal, the monitoring terminal to monitor, according to a restrained ProSe application identifier of the announcing terminal, announcement performed by the announcing terminal, wherein the restrained ProSe application identifier of the announcing terminal is used for the monitoring terminal to obtain an application layer Identifier (ID) of the announcing terminal.

9. A device for notifying an authorization update, which is located in a home network Proximity-based Services (ProSe) functional entity of an announcing terminal and comprises a hardware processor arranged to execute program modules comprising:
- a first receiving module, which is arranged to receive a notification message from a ProSe application server, wherein the notification message is used for notifying the home network ProSe functional entity of the announcing terminal that authorization information changes; and
- a first notifying module, which is arranged to notify a home network ProSe functional entity of a monitoring terminal that a ProSe code and/or filter corresponding to the announcing terminal become/becomes invalid or are/is updated;
- wherein the hardware processor is arranged to execute program modules comprising: a first processing module, which is arranged to find the announcing terminal according to context information of the announcing terminal, and notify the announcing terminal that the announcing terminal is forbidden to continue announcing the previous ProSe code and/or filter; and/or, a second processing module, which is arranged to issue the updated ProSe code and/or filter to the announcing terminal, or, notify that the previous ProSe code and/or filter become/becomes invalid to trigger the announcing terminal to obtain the ProSe code and/or filter again.

10. The device as claimed in claim 9, wherein the first receiving module is arranged to receive the notification message from the ProSe application server, wherein the notification message carries at least one of: a restrained ProSe application identifier, a ProSe discovery identifier, or a permission change indicator, where the permission change indicator is indicative of a change from permitting the announcing terminal to announce into forbidding the announcing terminal to announce.

11. The device as claimed in claim 9, wherein the first receiving module is arranged to receive the notification message from the ProSe application server, wherein the notification message carries at least one of: a restrained ProSe application identifier of the announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

12. The device as claimed in claim 10, wherein the hardware processor is arranged to execute program modules comprising:
a second notifying module, which is arranged to notify a visited network ProSe functional entity of the announcing terminal that the previous ProSe code and/or filter announced by the announcing terminal have/has become invalid, and/or, send the updated ProSe code and/or filter to the visited network ProSe functional entity of the announcing terminal; and
a second receiving module, which is arranged to receive a response message from the visited network ProSe functional entity of the announcing terminal.

13. The device as claimed in claim 9, wherein the hardware processor is arranged to execute program modules comprising:
a determining module, which is arranged to determine the home network ProSe functional entity of the monitoring terminal according to information of the monitoring terminal provided by the ProSe application server or according to recorded information of the monitoring terminal which has obtained the previous ProSe code and/or filter announced by the announcing terminal from the home network ProSe functional entity of the announcing terminal.

14. A device for notifying an authorization update, which is located in a home network Proximity-based Services (ProSe) functional entity of a monitoring terminal and comprises a hardware processor arranged to execute program modules comprising:

a receiving module, which is arranged to receive a notification message from a ProSe application server, wherein the notification message is used for notifying the home network ProSe functional entity of the monitoring terminal that authorization information changes; and
a triggering module, which is arranged to trigger the monitoring terminal to initiate a monitoring process;
wherein the receiving module is arranged to receive the notification message from the ProSe application server, wherein the notification message carries at least one of: a restrained ProSe application identifier of an announcing terminal, a ProSe discovery identifier of the announcing terminal, a restrained ProSe application identifier of the monitoring terminal, a ProSe discovery identifier of the monitoring terminal, or a permission change indicator, where the permission change indicator is indicative of a change from permitting the monitoring terminal to monitor the announcing terminal into forbidding the monitoring terminal to monitor the announcing terminal.

15. The device as claimed in claim 14, wherein the hardware processor is arranged to execute program modules comprising:
a determining module, which is arranged to determine that the monitoring terminal once triggered a monitoring request but the monitoring request was refused; and
a notifying module, which is arranged to notify the monitoring terminal to obtain a ProSe code and/or filter of the announcing terminal again.

16. The device as claimed in claim 14, wherein the triggering module is arranged to notify the monitoring terminal to monitor, according to a restrained ProSe application identifier of the announcing terminal, announcement performed by the announcing terminal, wherein the restrained ProSe application identifier of the announcing terminal is used for the monitoring terminal to obtain an application layer Identifier (ID) of the announcing terminal.

* * * * *